US011451119B2

(12) United States Patent
Aso et al.

(10) Patent No.: US 11,451,119 B2
(45) Date of Patent: Sep. 20, 2022

(54) MOTOR WITH A BOARD HAVING MICROCOMPUTER AND DRIVE CIRCUIT, AND AIR CONDITIONING APPARATUS HAVING THE MOTOR

(71) Applicant: Mitsubishi Electric Corporation, Tokyo (JP)

(72) Inventors: Hiroki Aso, Tokyo (JP); Takaya Shimokawa, Tokyo (JP); Ryogo Takahashi, Tokyo (JP); Kazuma Nomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 262 days.

(21) Appl. No.: 16/480,712

(22) PCT Filed: Mar. 27, 2017

(86) PCT No.: PCT/JP2017/012232
§ 371 (c)(1),
(2) Date: Jul. 25, 2019

(87) PCT Pub. No.: WO2018/179025
PCT Pub. Date: Oct. 4, 2018

(65) Prior Publication Data
US 2020/0028415 A1    Jan. 23, 2020

(51) Int. Cl.
*H02K 11/33* (2016.01)
*H02K 11/215* (2016.01)
(Continued)

(52) U.S. Cl.
CPC ............ *H02K 11/33* (2016.01); *F24F 1/0018* (2013.01); *G05B 19/042* (2013.01); *H02K 1/146* (2013.01);
(Continued)

(58) Field of Classification Search
CPC ............ H02K 1/33; H02K 1/125; H02K 1/30; H02K 1/146; H02K 1/276; H02K 9/22;
(Continued)

(56) References Cited

U.S. PATENT DOCUMENTS 8,704,417 B2 * 4/2014 Kamogi ................ H02K 11/33
310/71
2010/0320880 A1 * 12/2010 Kamogi ................ H02K 11/33
310/68 B
(Continued)

FOREIGN PATENT DOCUMENTS

CN      101617460 A    12/2009
EP      1 982 405 A    10/2008
(Continued)

OTHER PUBLICATIONS

JP2015115593A English Translation (Year: 2015).*
(Continued)

*Primary Examiner* — Maged M Almawri
(74) *Attorney, Agent, or Firm* — Posz Law Group, PLC

(57) ABSTRACT

A motor includes a rotor having a rotation shaft, a rotor core attached to the rotation shaft, and a rotor magnet embedded in the rotor core, a stator disposed on an outer side of the rotor in a radial direction about a central axis of the rotation shaft and surrounding the rotor, a board disposed on one side of the stator in a direction of the central axis, and a microcomputer mounted on the board. The microcomputer is disposed on an outer side of the rotor magnet in the radial direction.

18 Claims, 11 Drawing Sheets

(51) Int. Cl.
*F24F 1/0018* (2019.01)
*G05B 19/042* (2006.01)
*H02K 1/14* (2006.01)
*H02K 1/276* (2022.01)
*H02K 9/22* (2006.01)
*H02K 21/16* (2006.01)

(52) U.S. Cl.
CPC .............. *H02K 1/276* (2013.01); *H02K 9/22* (2013.01); *H02K 11/215* (2016.01); *H02K 21/16* (2013.01); *G05B 2219/25252* (2013.01); *H02K 2211/03* (2013.01)

(58) Field of Classification Search
CPC ... H02K 21/16; H02K 2211/03; F24F 1/0018; G05B 2219/25252; G05B 19/042
USPC ................................................ 310/64, 68 B
See application file for complete search history.

(56) References Cited

U.S. PATENT DOCUMENTS

| | | | |
|---|---|---|---|
| 2012/0098378 A1* | 4/2012 | Takemoto | H02K 21/16 310/156.53 |
| 2013/0183175 A1* | 7/2013 | Irie | F04C 2/102 310/156.53 |
| 2014/0028161 A1* | 1/2014 | Kamogi | H02K 11/33 361/803 |
| 2014/0091683 A1* | 4/2014 | Ito | B62D 5/0406 310/68 R |
| 2014/0152138 A1* | 6/2014 | Tanaka | H02K 1/32 310/156.28 |
| 2014/0167572 A1* | 6/2014 | Woo | H02K 11/215 310/68 B |
| 2014/0246958 A1 | 9/2014 | Taniguchi | |
| 2015/0171709 A1* | 6/2015 | Ito | H02K 9/22 310/52 |
| 2017/0305456 A1 | 10/2017 | Iwabuki et al. | |
| 2019/0006898 A1* | 1/2019 | Yokoyama | H02K 1/27 |
| 2019/0173337 A1* | 6/2019 | Shimokawa | H02K 15/03 |
| 2020/0028415 A1* | 1/2020 | Aso | G05B 19/042 |
| 2020/0251944 A1* | 8/2020 | Watanabe | H02K 1/2766 |
| 2020/0336046 A1* | 10/2020 | Shimokawa | H02K 1/2746 |
| 2021/0018227 A1* | 1/2021 | Shimokawa | F25B 1/04 |
| 2021/0135520 A1* | 5/2021 | Shimokawa | F24F 13/24 |
| 2021/0211003 A1* | 7/2021 | Shimokawa | H02K 1/2746 |

FOREIGN PATENT DOCUMENTS

| | | |
|---|---|---|
| JP | H07-087696 A | 3/1995 |
| JP | H08-223877 A | 8/1996 |
| JP | 2002-349137 A | 12/2002 |
| JP | 2005-261001 A | 9/2005 |
| JP | 4159493 B2 | 10/2008 |
| JP | 2010-263697 A | 11/2010 |
| JP | 4649990 B2 | 3/2011 |
| JP | 2012-244783 A | 12/2012 |
| JP | 2013-090501 A | 5/2013 |
| JP | 5361942 B2 | 12/2013 |
| JP | 2014-052848 A | 3/2014 |
| JP | 2014-171320 A | 9/2014 |
| JP | 2015-115593 A | 6/2015 |
| WO | 2016/117144 A1 | 7/2016 |

OTHER PUBLICATIONS

Japanese Office Action dated Jan. 19, 2021, issued in corresponding JP Patent Application No. 2019-508328 (and English Machine Translation).
Office Action dated May 8, 2021 issued in corresponding CN patent application No. 201780087014.3 (and English machine translation).
Office Action dated Oct. 10, 2020 issued in corresponding CN patent application No. 201780087014.3 (and English translation).
Office Action dated Feb. 19, 2021, issued in corresponding EP Patent Application No. 17903292.5.
Extended European Search Report dated Feb. 24, 2020 issued in corresponding EP patent application No. 17903292.5.
International Search Report of the International Searching Authority dated May 30, 2017 for the corresponding International application No. PCT/JP2017/012232 (and English translation).
Office Action dated Jun. 16, 2020 issued in corresponding JP patent application No. 2019-508328 ( and English translation).
Office Action dated Nov. 1, 2021 in connection with counterpart CN Patent Application No. 201780087014.3, as well as a machine English translation.
Office Action dated Mar. 2, 2022 in connection with counterpart CN Patent Application No. 201780087014.3. (and English machine translation).
Office Action dated Jul. 5, 2022 in connection with counterpart European Patent Application No. 17903292.5.

* cited by examiner

MOTOR WITH A BOARD HAVING MICROCOMPUTER AND DRIVE CIRCUIT, AND AIR CONDITIONING APPARATUS HAVING THE MOTOR

CROSS REFERENCE TO RELATED APPLICATION

This application is a U.S. national stage application of International Patent Application No. PCT/JP2017/012232 filed on Mar. 27, 2017, the disclosure of which is incorporated herein by reference.

TECHNICAL FIELD

The present invention relates to a motor and an air conditioning apparatus including the motor.

BACKGROUND

Conventionally, a permanent magnet embedded motor in which permanent magnets are embedded in a rotor is widely used. There is proposed a permanent magnet embedded motor in which a sensor magnet for detecting a rotational position of the rotor is attached to one end of a rotation shaft of a rotor, and a board provided with a magnetic sensor is disposed to face the sensor magnet (see, for example, Patent Reference 1).

PATENT REFERENCE

Patent Reference 1: Japanese Patent Application Publication No. 2014-171320 (see FIGS. 1 and 5)

In the motor described above, however, in order to suppress influence of magnetic flux of the permanent magnets of the rotor on the magnetic sensor, the board provided with the magnetic sensor is disposed at a distance from the rotor in the axial direction. Accordingly, there is a problem of increase in size of the motor.

Further, it is conceivable to mount a microcomputer on the motor for performing arithmetic to control rotation of the motor. If the microcomputer is influenced by magnetic flux of the permanent magnets, malfunction such as stopping of rotation of the motor or a change in the rotation speed may occur.

SUMMARY

The present invention is intended to solve the problems described above, and an object of the present invention is to enable stable rotation control of the motor without increase in size of the motor.

A motor according to the present invention includes a rotor having a rotation shaft, a rotor core attached to the rotation shaft, and a rotor magnet embedded in the rotor core, a stator disposed on an outer side of the rotor in a radial direction about a central axis of the rotation shaft and surrounding the rotor, a board disposed on one side of the stator in a direction of the central axis, and a microcomputer mounted on the board. The microcomputer is disposed on an outer side of the rotor magnet in the radial direction.

According to the present invention, since the microcomputer is disposed on the outer side of the rotor magnet in the radial direction, the influence of magnetic flux of the rotor magnet on the microcomputer can be suppressed. This enables stable rotation control of the motor. Further, the board provided with the microcomputer and the rotor are not necessarily separated at a large distance from each other in the axial direction, and thus the size of the motor can be reduced.

DETAILED DESCRIPTION

Embodiments of the present invention will be described in detail with reference to the drawings. These embodiments do not limit the present invention.

First Embodiment (Configuration of Motor 1)

Figure 1:
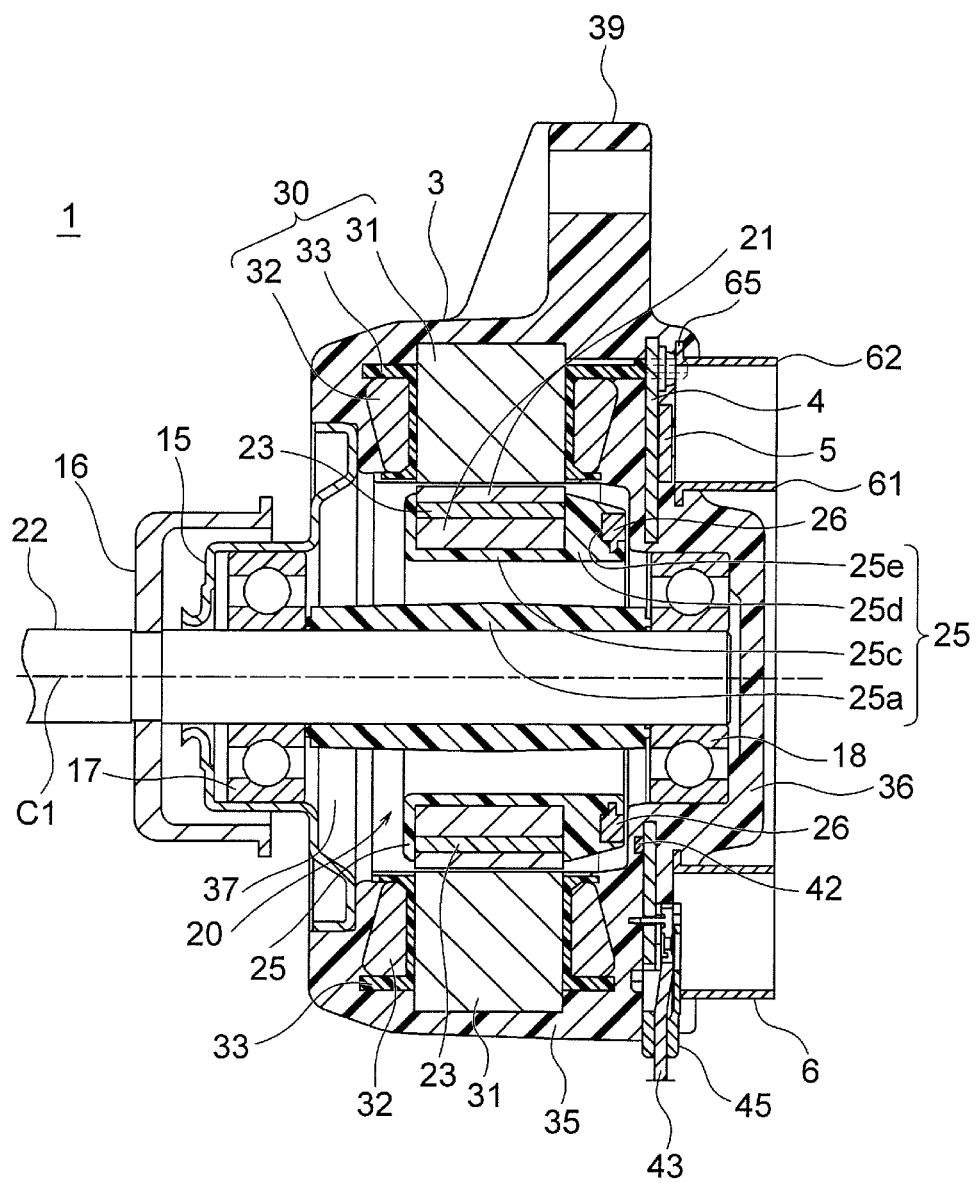
FIG. 1 is a longitudinal sectional view illustrating a motor in a first embodiment.

FIG. 1 is a longitudinal sectional view illustrating a motor 1 in a first embodiment of the present invention. The motor 1 is an interior permanent magnet (IPM) motor in which permanent magnets (rotor magnets 23) are embedded in a rotor 20.

The motor 1 includes the rotor 20, a stator 30 provided to surround the rotor 20, and a board 4 attached to the stator 30. The rotor 20 includes a shaft 22 that is a rotation shaft. A central axis of the shaft 22 (i.e., an axis extending in a longitudinal direction of the shaft 22 through a center of the shaft 22 in a radial direction) will be referred to as a central axis C1. The stator 30 and the board 4 are covered with a mold resin portion 35, thereby constituting a mold stator 3.

In the following description, a direction along the central axis C1 will be simply referred to as an "axial direction." A circumferential direction about the central axis C1 will be simply referred to as a "circumferential direction" and is indicated by arrow R1 in the drawings (FIGS. 2, 3, 5, 7, and 10). A radial direction of each of the stator 30 and the rotor 20 with respect to the central axis C1 will be simply referred to as a "radial direction". A longitudinal sectional view is a sectional view taken along a plane parallel to the central axis C1, and a cross sectional view is a sectional view taken along a plane perpendicular to the central axis C1.

The shaft 22 projects leftward from the stator 30 in FIG. 1, and an impeller of an air supply fan, for example, is attached to a projecting part of the shaft 22. Thus, the projecting side of the shaft 22 (left in FIG. 1) will be referred to as a "load side" and its opposite side (right in FIG. 1) will be referred to as a "counter-load side."

(Configuration of Rotor 20)

Figure 2:
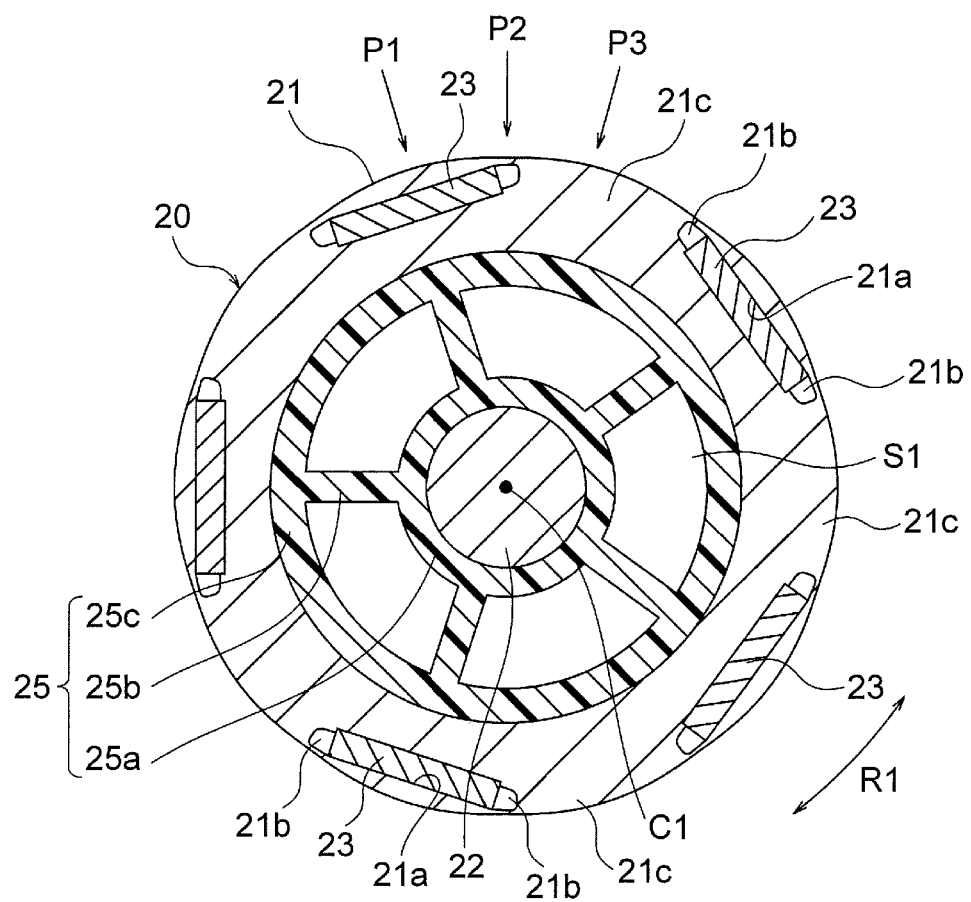
FIG. 2 is a cross sectional view illustrating a rotor in the first embodiment.

FIG. 2 is a cross sectional view illustrating the rotor 20 of the motor 1. The rotor 20 includes a shaft 22 extending along the central axis C1, a rotor core 21 having an annular shape about the central axis C1, a plurality of rotor magnets (permanent magnets) 23 attached to the rotor core 21, and a resin portion 25 supporting the rotor core 21.

The rotor core 21 is constituted by a stacked body obtained by stacking a plurality of electromagnetic steel sheets in the axial direction and fixing the stacked sheets by crimping, welding, bonding, or the like. The rotor core 21 includes a plurality of magnet insertion holes 21a arranged in the circumferential direction. The number of the magnet insertion holes 21a is five in this example, but is not limited to five. The five magnet insertion holes 21a are arranged at regular intervals in the circumferential direction in an outer peripheral portion of the rotor core 21. Each of the magnet insertion holes 21a is provided through the rotor core 21 in the axial direction and has a width in the circumferential direction.

The rotor magnet 23 is inserted in each of the five magnet insertion holes 21a. The rotor magnet 23 has a rectangular flat-plate shape in a cross section perpendicular to the axial direction. The rotor magnet 23 is a rare earth magnet, and more specifically, is a neodymium sintered magnet containing neodymium (Nd), iron (Fe), and boron (B).

Flux barrier portions 21b that are openings are formed at both ends of each of the magnet insertion holes 21a in the circumferential direction. The flux barrier portions 21b suppress short circuits of magnetic flux (i.e., leakage magnetic flux) between adjacent ones of the rotor magnets 23.

The five rotor magnets 23 are arranged so that the same magnetic poles (for example, north poles) face an outer peripheral side of the rotor core 21. Thus, in portions of the rotor core 21 positioned between adjacent ones of the rotor magnets 23, magnetic flux flows in the radial direction. That is, pseudo-magnetic poles 21c (for example, south poles) opposite to those of the rotor magnets 23 are formed.

That is, in the rotor 20, the five magnet magnetic poles (rotor magnets 23) and the five pseudo-magnetic poles 21c are alternately arranged in the circumferential direction. Thus, the rotor 20 includes ten magnetic poles. The ten magnetic poles of the rotor 20 are arranged at regular intervals in the circumferential direction with a pole pitch of 36 degrees (360 degrees divided by 10). The motor having such a rotor structure is called a consequent pole type. The number of magnetic poles of the rotor 20 is not limited to ten.

An outer periphery of the rotor core 21 has a so-called flower circular shape. In other words, the outer periphery of the rotor core 21 has a shape such that an outer diameter of the rotor core 21 is at the maximum at pole centers P1 and P3 (centers of the magnetic poles in the circumferential direction), is at the minimum at an inter-pole P2 (between adjacent magnetic poles) and is curved from each of the pole centers P1 and P3 to the inter-pole P2. In this example, the pole center P1 is a center of the magnet magnetic pole (i.e., center of the rotor magnet 23 in the circumferential direction), and the pole center P3 is a center of the pseudo-magnetic pole 21c.

The resin portion 25 supports the rotor core 21 with respect to the shaft 22, and is constituted by thermoplastic resin such as polybutylene terephthalate (PBT). The resin portion 25 includes an inner cylindrical part 25a attached to an outer peripheral surface of the shaft 22, an annular outer cylindrical part 25c disposed at an outer side of the inner cylindrical part 25a in the radial direction, and a plurality of (five in this embodiment) ribs 25b connecting the inner cylindrical part 25a and the outer cylindrical part 25c to each other.

The shaft 22 is provided through the inner cylindrical part 25a of the resin portion 25. The ribs 25b are arranged at regular intervals in the circumferential direction, and extend outward from the inner cylindrical part 25a in the radial direction. Positions of the ribs 25b correspond to the centers of the rotor magnets 23 in the circumferential direction. A gap S1 is formed between each adjacent ones of the ribs 25b in the circumferential direction.

As illustrated in FIG. 1, the resin portion 25 is formed to also cover end surfaces of the rotor core 21 in the axial direction. This configuration prevents detachment of the rotor magnets 23 from the magnet insertion holes 21a. A part of the resin portion 25 at one side of the rotor core 21 in the axial direction (more specifically, a side facing the board 4 described later) will be referred to as an end surface covering portion 25d.

An annular sensor magnet (position detection magnet) 26 is attached to the rotor core 21. The sensor magnet 26 is held by a sensor magnet holding portion 25e formed in the end surface covering portion 25d of the resin portion 25. That is, the sensor magnet 26 is held by the resin portion 25 together with the shaft 22 and the rotor core 21. The sensor magnet 26 includes the same number (ten in this example) of magnetic poles as the number of the rotor magnets 23. A magnetization direction of the sensor magnet 26 is the axial direction. The magnetic poles of the sensor magnet 26 are arranged at regular intervals in the circumferential direction.

(Configuration of Stator 30)

The stator 30 is disposed on an outer side of the rotor 20 in the radial direction, and surrounds the rotor 20. The stator 30 includes an annular stator core 31, insulators (insulating portions) 33 attached to the stator core 31, and coils 32 wound around the stator core 31 via the insulators 33.

Figure 3:
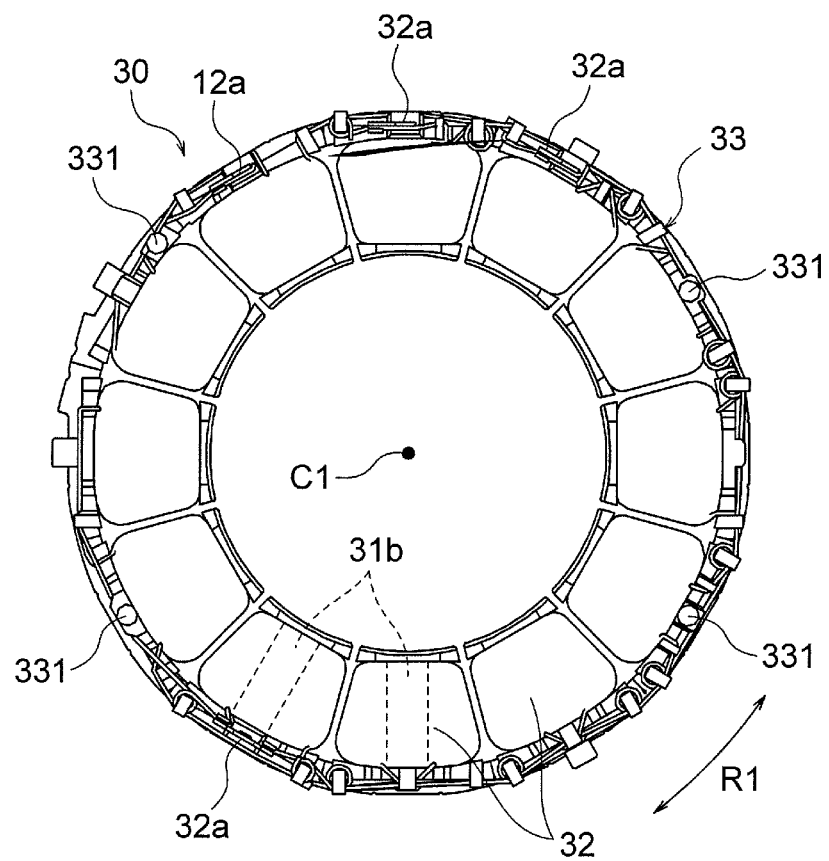
FIG. 3 is a plan view illustrating a stator in the first embodiment.
Figure 4:
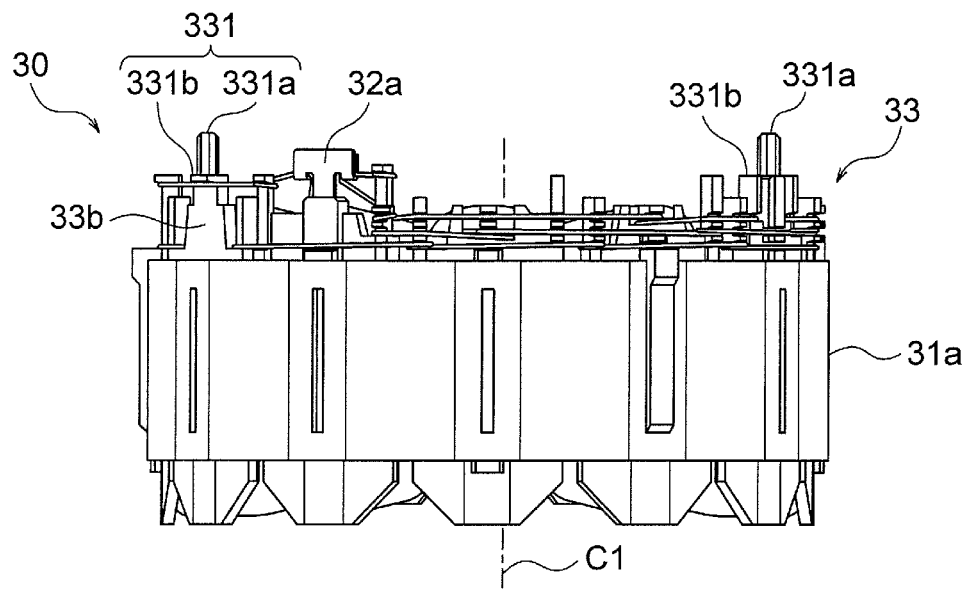
FIG. 4 is a side view illustrating the stator in the first embodiment.

FIGS. 3 and 4 are a plan view and a side view, respectively, illustrating the stator 30. The stator core 31 is constituted by a stacked body obtained by stacking a plurality of electromagnetic steel sheets in the axial direction and fixing the stacked sheets by crimping, welding, bonding, or the like. The stator core 31 includes a yoke 31a extending in the circumferential direction, and a plurality of teeth 31b extending from the yoke 31a inward in the radial direction (toward the central axis C1). Front end surfaces of the teeth 31b on an inner side in the radial direction face an outer peripheral surface of the rotor 20 (FIG. 2). The number of the teeth 31b is twelve in this embodiment, but is not limited to twelve.

The coils 32 are wound around the teeth 31b via the insulators 33. The insulators 33 insulate the teeth 31b and the coils 32 from each other. The insulators 33 are formed by molding thermoplastic resin such as PBT integrally with the stator core 31 or by attaching a molded body, which is molded beforehand, to the stator core 31.

Figure 6:
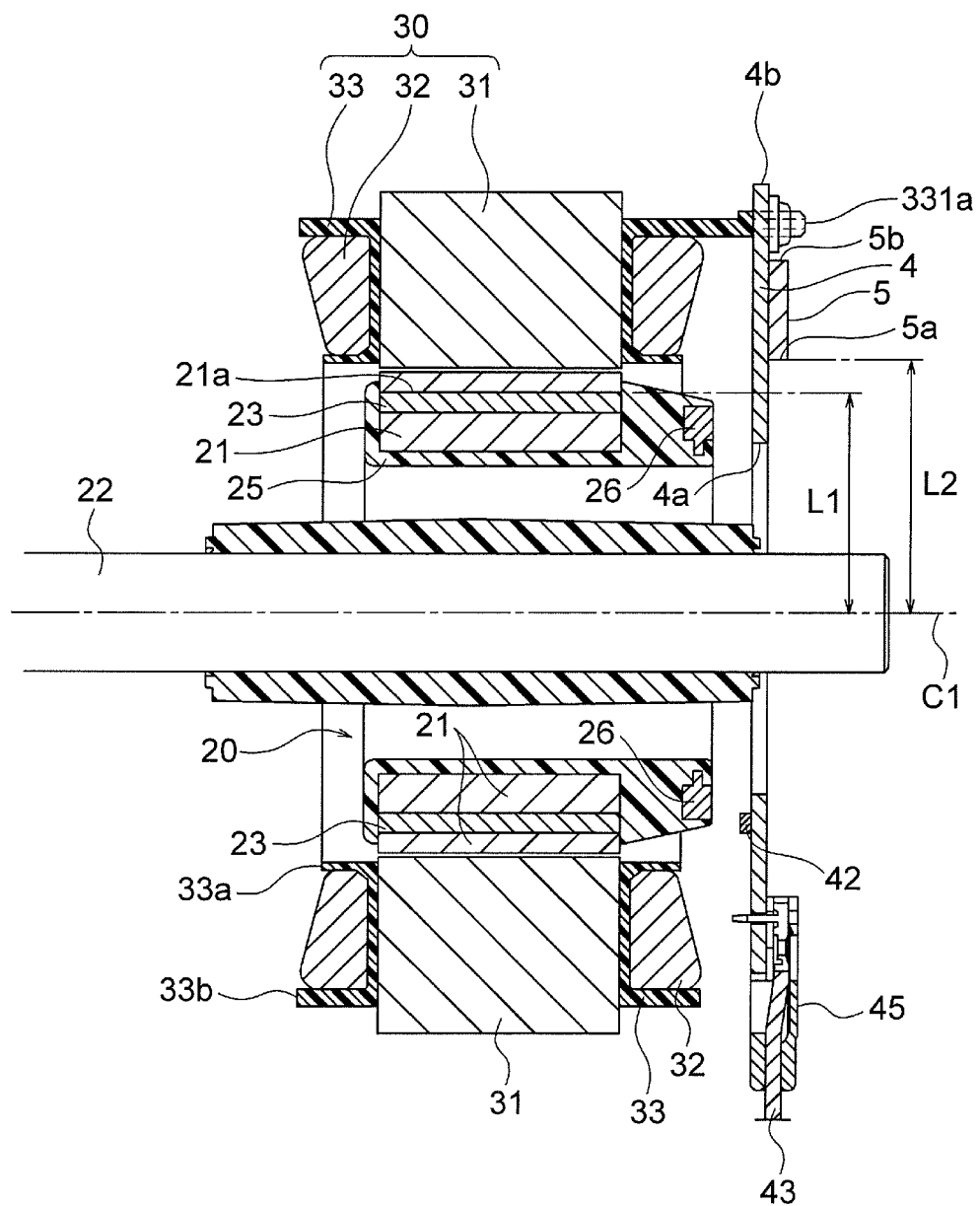
FIG. 6 is a diagram schematically illustrating arrangement of a microcomputer on the board in the first embodiment.

In addition to a portion surrounding the tooth 31b, the insulator 33 includes an inner peripheral wall 33a (FIG. 6)

and an outer peripheral wall 33b (FIG. 4) supporting the coil 32 from an inner side and an outer side in the radial direction. Board fixing portions 331 for fixing the board 4 are formed on the outer peripheral walls 33b of the insulators 33. In this example, a plurality of board fixing portions 331 are arranged along the outer peripheries of the insulators 33. The number of the board fixing portions 331 is four, for example, but is not limited to four.

The board fixing portions 331 include projections 331a and support portions 331b. The projections 331a are inserted in attachment holes 44 (FIG. 5) formed in the board 4. The support portions 331b contact a lower surface of the board 4 and support the board 4 in the axial direction. Terminals 32a to which the coils 32 are connected are disposed on the outer peripheral walls 33b of the insulators 33.

The coils 32 are formed by, for example, winding magnet wires around the teeth 31b. The coils 32 are three-phase windings and constituted by coils of a U phase, a V phase, and a W phase. The coils 32 are connected to the terminals 32a disposed on the insulators 33 by fusing (thermal crimping), soldering or the like.

As illustrated in FIG. 1, the stator 30 and the board 4 described later are covered with the mold resin portion 35. The mold resin portion 35 is constituted by, for example, thermosetting resin such as bulk molding compound (BMC). The mold resin portion 35 includes a bearing support portion 36 on one side in the axial direction (right in FIG. 1) and an opening 37 on the other side (left in FIG. 1). The rotor 20 is inserted in a hollow portion inside the stator 30 through the opening 37.

A metal bracket 15 is attached to the opening 37 of the mold resin portion 35. One bearing 17 supporting the shaft 22 is held in the bracket 15. A cap 16 for preventing water and other substances from entering into the bearing 17 is attached to the outer side of the bracket 15. Another bearing 18 supporting the shaft 22 is held by the bearing support portion 36.

The mold resin portion 35 includes a plurality of legs 39 (FIG. 7) extending from an outer periphery of the mold resin portion 35 outward in the radial direction. The legs 39 include holes 39a through which fixing members such as screws are inserted when the motor 1 is attached to an apparatus such as a fan. In this example, four legs 39 are provided, but the number of the legs 39 is not limited to four.

(Configuration of Board 4)

Figure 5:
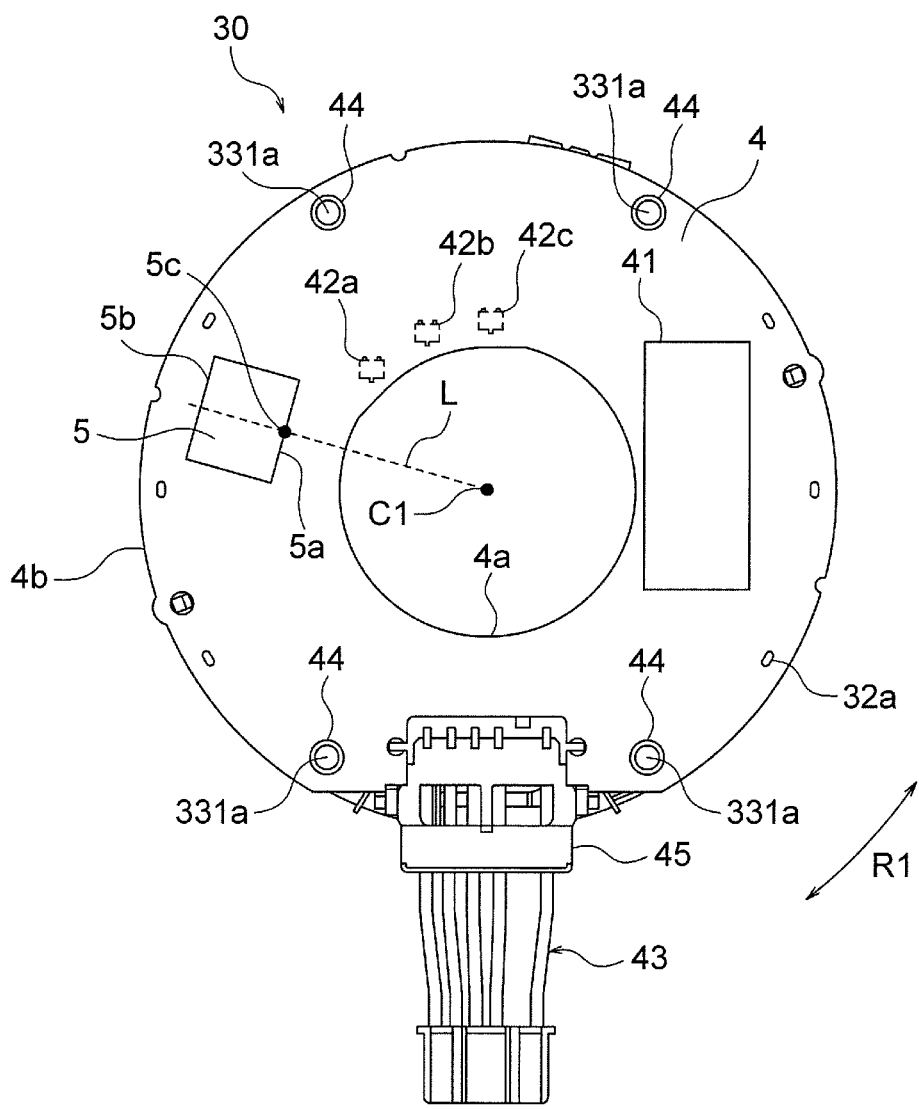
FIG. 5 is a plan view illustrating a state where a board is attached to the stator in the first embodiment.

FIG. 5 is a plan view illustrating a state where the board 4 is attached to the stator 30. FIG. 6 is a longitudinal sectional view illustrating the board 4, the stator 30, and the rotor 20. The board 4 is disposed at one side of the stator 30 in the axial direction. In other words, the board 4 is disposed to face the stator 30 in the axial direction. The board 4 is disposed at the counter-load side (right in FIG. 1) of the stator 30 in this example, but may be disposed at the load side (left in FIG. 1).

The board 4 is constituted by, for example, a printed circuit board. The printed circuit board is a board obtained by forming a wiring pattern of a conductor on a plate-shaped insulating substrate. A through-hole may be formed in the board 4 as necessary. As described above, the board 4 is held integrally with the stator 30 by the mold resin portion 35 (FIG. 1). The mold resin portion 35 is composed of, for example, BMC. BMC is capable of being molded at low pressure, and thus deformation of the board 4 and the like can be suppressed in molding.

The board 4 includes an inner peripheral edge 4a that is an inner edge in the radial direction and an outer peripheral edge 4b that is an outer edge in the radial direction. As illustrated in FIG. 6, the inner peripheral edge 4a faces the outer peripheral surface of the shaft 22. A plurality of attachment holes 44 engaging with the projections 331a of the board fixing portions 331 described above are formed along the outer peripheral edge 4b of the board 4.

As illustrated in FIG. 5, Hall elements 42a, 42b, and 42c, a drive circuit 41, and a microcomputer 5 are mounted on the board 4. The Hall elements 42a, 42b, and 42c, the drive circuit 41, and the microcomputer 5 are electrically connected to each other via wires and through-holes formed in the board 4. The Hall elements 42a, 42b, and 42c, the drive circuit 41, and the microcomputer 5 are covered with the mold resin portion 35 described above, together with the board 4.

The Hall elements 42a, 42b, and 42c (collectively referred to as the Hall elements 42) are disposed on a surface (left surface in FIG. 6) of the board 4 on the stator 30 side. In contrast, the drive circuit 41 and the microcomputer 5 are disposed on a surface (right surface in FIG. 6) of the board 4 opposite to the stator 30.

Each of the Hall elements 42a, 42b, and 42c includes a Hall integrated circuit (IC). The Hall elements 42a, 42b, and 42c are arranged along the inner peripheral edge 4a of the board 4 so as to face the sensor magnet 26 of the rotor 20 in the axial direction. The Hall elements 42a, 42b, and 42c are arranged at positions slightly shifted outward from an outer peripheral edge of the sensor magnet 26 in the radial direction.

The Hall elements 42a, 42b, and 42c detect magnetic flux from the sensor magnet 26, and individually output detection signals. The Hall elements 42a, 42b, and 42c correspond to the U phase, the V phase, and the W phase, respectively.

The microcomputer 5 is obtained by mounting arithmetic circuits in one chip, and will be also referred to as an arithmetic section or an arithmetic device. Based on the detection signals from the Hall elements 42a, 42b, and 42c, the microcomputer 5 performs arithmetic processing to detect a relative rotational position of the rotor 20 relative to the stator 30, and outputs a driving signal based on the detection result, to the drive circuit 41.

The drive circuit 41 is a circuit for controlling rotation of the rotor 20. The drive circuit 41 is constituted by, for example, a power transistor. The drive circuit 41 includes an inverter circuit, and controls current supplied to the coils 32 based on a driving signal from the microcomputer 5.

The microcomputer 5 includes an inner-peripheral-side end 5a closest to the central axis C1, and an outer-peripheral-side end 5b farthest from the central axis C1. It is preferable that the inner-peripheral-side end 5a extends in a direction perpendicular to a line L in the radial direction passing through a center 5c of the inner-peripheral-side end 5a in the circumferential direction, and the outer-peripheral-side end 5b extends in parallel with the inner-peripheral-side end 5a. However, the inner-peripheral-side end 5a and the outer-peripheral-side end 5b are not limited to these shapes.

As illustrated in FIG. 6, the microcomputer 5 is disposed on an outer side of the rotor magnets 23 in the radial direction. In other words, a distance L2 in the radial direction from the central axis C1 to the inner-peripheral-side end 5a of the microcomputer 5 is larger than a distance L1 in the radial direction from the central axis C1 to an outer-peripheral-side end of the rotor magnets 23 (L2>L1).

Since the microcomputer 5 is disposed on the outer side of the rotor magnets 23 in the radial direction, the microcomputer 5 is less likely to be influenced by magnetic flux of the rotor magnets 23. Accordingly, stable rotation control of the motor 1 can be performed.

The microcomputer 5 is preferably disposed between two teeth 31b adjacent to each other in the circumferential direction (referred to as a first tooth 31b and a second tooth 31b) among the plurality of teeth 31b of the stator 30 in the circumferential direction. This arrangement further suppresses the influence of the magnetic flux of the rotor magnets 23 on the microcomputer 5.

Lead wires 43 are provided on the board 4. The lead wires 43 include power supply lead wires for supplying electric power to the coils 32 of the stator 30 and sensor lead wires for transmitting detection signal of the Hall elements 42 to the outside. In order to draw the lead wires 43 to the outside of the motor 1, a lead wire lead-out member 45 is attached to an outer peripheral portion of the board 4 so that the lead wire lead-out member 45 projects to the outside of the mold resin portion 35.

A heat sink 6 (FIG. 1) is attached to the side of the stator 30 on which the board 4 is disposed. The heat sink 6 is composed of, for example, aluminum. The heat sink 6 is configured to dissipate heat generated by the coils 32 of the stator 30, and the drive circuit 41 and the microcomputer 5 on the board 4 to the outside of the motor 1.

Figure 7:
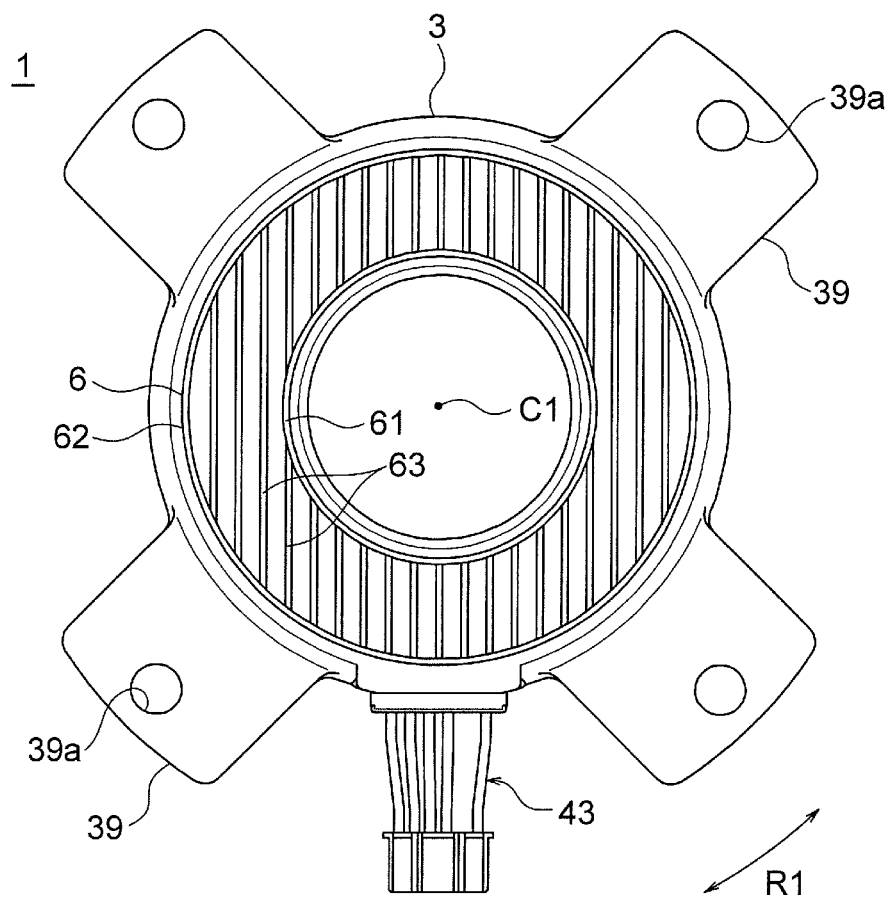
FIG. 7 is a plan view illustrating a heat sink of the motor in the first embodiment.

FIG. 7 is a plan view illustrating the heat sink 6 attached to the mold stator 3. The heat sink 6 includes an inner peripheral wall 61 and an outer peripheral wall 62 each having an annular shape about the central axis C1, and also includes a plurality of fins 63 between the inner peripheral wall 61 and the outer peripheral wall 62. The inner peripheral wall 61, the outer peripheral wall 62, and the fins 63 of the heat sink 6 project from the mold resin portion 35 in the axial direction.

An annular flange 65 (FIG. 1) is formed along each of the inner peripheral wall 61 and the outer peripheral wall 62 of the heat sink 6. This flange 65 is a portion covered with and held by the mold resin portion 35. Since the flange 65 of the heat sink 6 is held by the mold resin portion 35, the heat sink 6 is prevented from being displaced in the axial direction, and from being detached from the stator 30. The shape of the heat sink 6 is not limited to the shape illustrated in FIG. 7. It is sufficient that the heat sink 6 has a shape with which heat of the motor 1 can be dissipated to the outside.

As illustrated in FIG. 1, the heat sink 6 is disposed to face the drive circuit 41 (FIG. 5) and the microcomputer 5 on the board 4. The heat sink 6 may be disposed to contact the microcomputer 5 or the board 4. In such a case, heat generated by the microcomputer 5 or the like can be effectively dissipated to outside.

The mold resin portion 35 is not limited to BMC, and may be thermoplastic resin such as polyphenylene sulfide (PPS). Since PPS has a thermal conductivity higher than that of BMC, heat of the stator 30 and the board 4 is likely to be transferred to the heat sink 6, and thus heat dissipation from the motor 1 can be enhanced.

In a manufacturing process of the mold stator 3, the lead wires 43 are mounted on the board 4 provided with the drive circuit 41, the Hall elements 42, and the microcomputer 5. Thereafter, the projections 331a of the stator 30 are inserted through the attachment holes 44 of the board 4, and tips of the projections 331a are thermally-welded, ultrasonic-welded or the like, so that the board 4 is fixed to the stator 30. Subsequently, the stator 30, the board 4, and the heat sink 6 are integrally molded with resin such as BMC. Accordingly, the mold stator 3 in which the stator 30, the board 4, and a part of the heat sink 6 (flange 65) are covered with the mold resin portion 35 is obtained. It is also possible to form a hole or the like for screw fixing in the stator 30 beforehand, and to fix the heat sink 6 to the stator 30 using a tapping screw or the like after formation of the mold resin portion 35.

(Functions of Motor)

As described above, the motor 1 is of a consequent pole type, and the rotor 20 includes the magnet magnetic poles constituted by the rotor magnets 23 and the pseudo-magnetic poles 21c constituted by the rotor core 21. Magnetic flux of the rotor magnets 23 and the pseudo-magnetic poles 21c is interlinked with the coils 32 of the stator core 31, and a torque for rotating the rotor 20 is generated by causing current to flow in the coils 32.

As the rotor 20 rotates, the Hall elements 42a, 42b, and 42c detect magnetic flux of the sensor magnet 26 and individually output detection signals. The microcomputer 5 detects a rotational position of the rotor 20 by performing arithmetic processing based on the detection signals of the Hall elements 42a, 42b, and 42c and outputs a driving signal to the drive circuit 41. Based on the driving signal from the microcomputer 5, the drive circuit 41 controls current supplied to the coils 32 (U phase, V phase, and W phase) to control rotation of the rotor 20.

In the motor 1, since the rotor 20 includes the magnet magnetic poles and the pseudo-magnetic poles 21c, an imbalance (spatial biasing) of a magnetic flux density distribution is likely to occur, as compared to motors of a non-consequent pole type. In particular, in a case where the rotor magnets 23 generate high magnetic flux as is the case with rare earth magnets, the imbalance of the magnetic flux density distribution is more likely to occur.

When the microcomputer 5 is influenced by the magnetic flux, detection accuracy of the rotational position of the rotor 20 by the microcomputer 5 decreases, and its output may contain noise. Consequently, control of the motor 1 becomes unstable, and malfunction such as stopping of rotation of the motor 1 or a change in rotation speed of the motor 1 may occur.

In the first embodiment, however, since the microcomputer 5 is disposed on the outer side of the rotor magnets 23 in the radial direction, the microcomputer 5 is less likely to be influenced by the magnetic flux of the rotor magnets 23. Thus, detection accuracy of the rotational position by the microcomputer 5 can be enhanced. That is, malfunction of the motor 1 can be suppressed, and stable rotation control can be performed.

A heat-resistant temperature of the microcomputer 5 is generally about 85° C., but since the microcomputer 5 is disposed on the side of the board 4 opposite to the stator 30, heat generated by current flowing in the coils 32 is less likely to be transferred to the microcomputer 5.

Further, since the board 4 provided with the microcomputer is covered with the mold resin portion 35, heat of the microcomputer 5 is likely to be dissipated to the outside of the motor 1 through the mold resin portion 35, and heat dissipation can be enhanced.

Further, the microcomputer 5 is disposed between the teeth 31b of the stator 30 in the circumferential direction, and thus the microcomputer 5 is less likely to be influenced by leakage magnetic flux from the stator 30 (magnetic flux generated by current flowing in the coils 32). Thus, more stable rotation control of the motor 1 can be performed.

The magnetic flux of the rotor magnets 23 also reach the Hall elements 42, and thus detection signals of the Hall elements 42 are influenced by the imbalance of the magnetic flux density distribution described above. However, the detection signals of the Hall elements 42 are corrected by arithmetic processing of the microcomputer 5. Accordingly, influence of the imbalance of the magnetic flux density distribution specific to the consequent pole type can be eliminated, and detection accuracy of the rotational position of the rotor 20 can be enhanced.

Figure 8A:
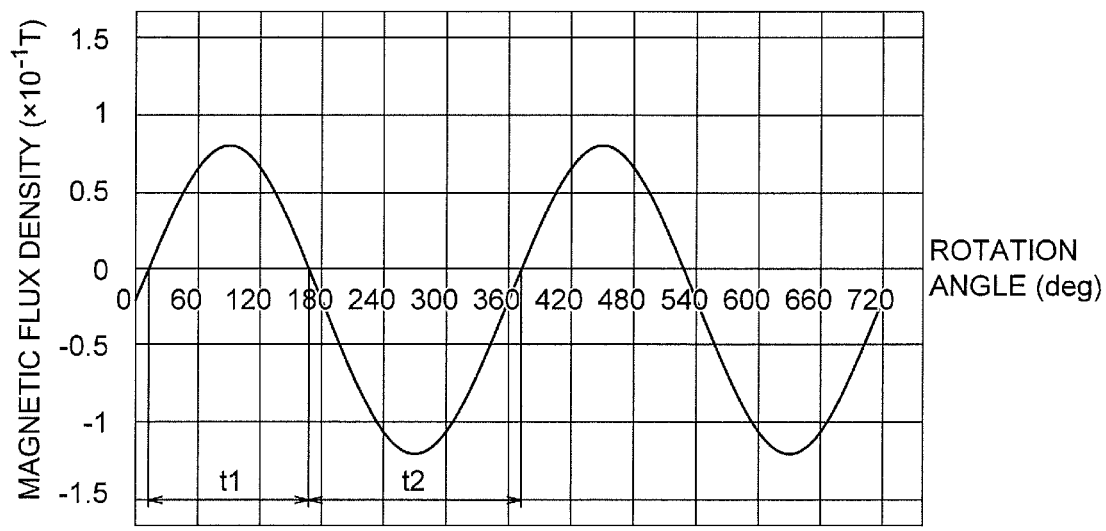
FIG. 8(A) is a diagram showing an example of a change in magnetic flux density detected by a Hall element in the first embodiment.
Figure 8B:
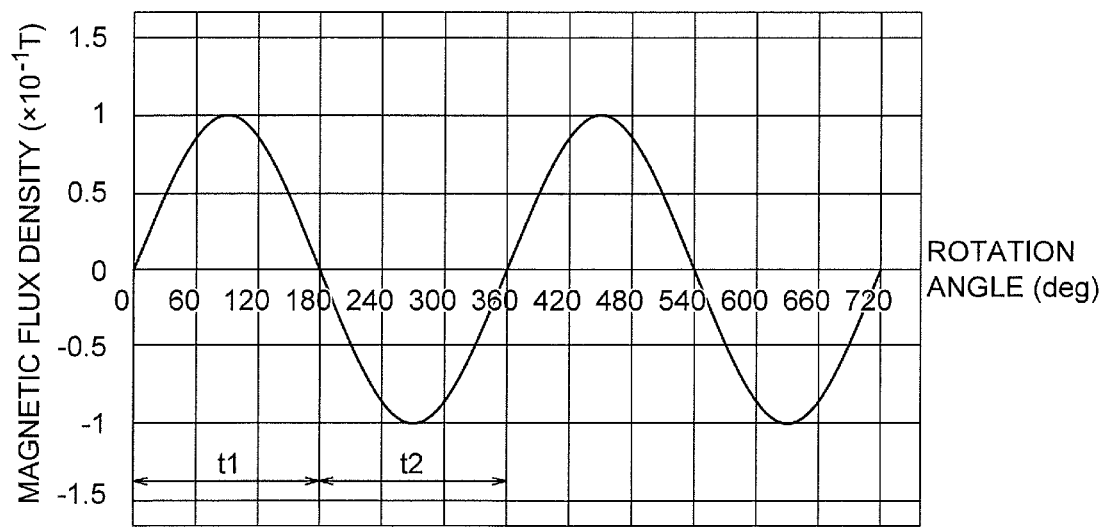
FIG. 8(B) is a diagram showing an example of a change in magnetic flux density after correction by the microcomputer.

FIG. 8(A) is a graph showing an example of a change in magnetic flux density detected by the Hall element 42. FIG. 8(B) is a graph showing an example of a change in magnetic flux density corrected by arithmetic processing of the microcomputer 5. In each of FIGS. 8(A) and 8(B), a vertical axis indicates magnetic flux density, and a horizontal axis indicates a rotation angle of the rotor 20.

In a detecting process of the rotational position of the rotor 20, a magnetic pole boundary (boundary between the north pole and the south pole) of the sensor magnet 26 is determined to pass through the Hall element 42, when the magnetic flux density detected by the Hall element 42 reaches a magnetic flux density range of ±3 mT (range taking a hysteresis width into consideration). Thus, as shown in FIG. 8(A), if there is an imbalance in the magnetic flux density distribution, a detection interval of the magnetic pole boundary varies as indicated by t1 and t2 in FIG. 8(A).

In view of this, as shown in FIG. 8(B), the microcomputer 5 corrects the magnetic flux density detected by the Hall element 42 so as to make the detection interval of the magnetic pole boundary constant (i.e., t1=t2). Accordingly, influence of the imbalance of the magnetic flux density distribution is canceled, and detection accuracy of the rotational position of the rotor 20 can be enhanced. That is, distortion of driving current can be suppressed, and noise and vibration of the motor 1 can be suppressed.

In this regard, drive control of the motor 1 is not limited to drive control based on the detection signals of the Hall elements 42. For example, the microcomputer 5 may detect a rotational position of the rotor 20 based on a waveform of induced voltage or the like, and drive control (sensorless drive) of the motor 1 may be performed based on the detected rotational position. The induced voltage can be obtained by providing the board 4 with a resistor for detecting current flowing in the coils 32 and detecting current flowing in the resistor.

In the case of sensorless drive, the motor 1 can be driven without influence of the imbalance of the magnetic flux density distribution, and thus the sensorless drive is advantageous in terms of suppressing noise and vibration of the motor 1. Further, the Hall elements 42 can be eliminated, and thus manufacturing cost of the motor 1 can be reduced.

In this regard, the drive control of the motor 1 using the Hall elements 42 has an advantage such that the rotational position of the rotor 20 can be detected even in a state where no current flows in the coils 32. Thus, starting of the motor 1 and rotation control of the motor 1 can be easily performed from a state where the rotor 20 is rotated by wind blowing against an impeller of a fan (free-run state), for example.

Further, since the sensor magnet 26 is disposed on the board 4 side of the rotor 20 in the axial direction, magnetic flux reaching the Hall elements 42 from the sensor magnet 26 are larger than magnetic flux reaching the Hall elements 42 from the rotor magnets 23. This can suppress the influence of the magnetic flux of the rotor magnets 23 on the Hall elements 42.

In the motor 1 of the consequent pole type, large amount of current magnetic flux (magnetic flux generated by current flowing in the coils 32) passes through the pseudo-magnetic poles 21c of the rotor 20, and vibration of the motor 1 due to current harmonics may increase, so that noise may be generated. The vibration of the motor 1 can be reduced to an audibly unnoticeable level by setting an output waveform of the drive circuit 41 to a sign wave and setting its carrier frequency to 10 kHz or higher.

Advantages of Embodiment

As described above, in the first embodiment of the present invention, the microcomputer 5 is disposed on the outer side of the rotor magnets 23 in the radial direction, and thus the influence of the magnetic flux of the rotor magnets 23 on the microcomputer 5 can be suppressed. Thus, malfunction of the motor 1 can be suppressed, and stable rotation control can be performed.

In particular, in the consequent pole type motor 1 in which the imbalance of the magnetic flux density distribution is likely to occur, the use of the microcomputer 5 disposed as described above provides a significant advantage in enabling stable rotation control of the motor 1.

Further, since the microcomputer 5 is disposed on the surface of the board 4 opposite to the stator 30 side, influence of heat generated by the coils 32 on the microcomputer 5 can be suppressed.

Further, since the Hall elements 42 for detecting magnetic flux from the sensor magnet 26 of the rotor 20 are mounted on the board 4, the microcomputer 5 can detect the rotational position of the rotor 20 based on the detection signals of the Hall elements 42.

Further, since the Hall elements 42 are disposed on the surface of the board 4 on the stator 30 side, the magnetic flux from the sensor magnet 26 can be easily detected as compared to the magnetic flux from the rotor magnets 23. Accordingly, detection accuracy of magnetic flux by the Hall elements 42 can be enhanced.

Further, since the microcomputer 5 is disposed between two adjacent teeth 31b (i.e., the first tooth and the second tooth) of the stator 30, influence of leakage magnetic flux of the stator 30 on the microcomputer 5 can be suppressed.

Further, since the board 4 is fixed to the board fixing portions 331 formed on the insulators 33 of the stator 30, the board 4 can be held stably at a position facing the stator 30.

Further, since the heat sink 6 is disposed on the side of the board 4 opposite to the stator 30 side, heat generated by the microcomputer 5 or the like can be dissipated to the outside from the heat sink 6, and thus heat dissipation can be enhanced.

In addition, since the mold resin portion 35 covering the stator 30, the board 4, and the microcomputer 5 is also provided, heat generated by the stator 30, the board 4, and the microcomputer 5 can be dissipated to the outside from the mold resin portion 35. Accordingly, heat dissipation can be enhanced.

Further, since the drive circuit 41 is disposed on the surface of the board 4 opposite to the stator 30, influence of the magnetic flux of the rotor magnets 23 and the leakage magnetic flux of the stator 30 on the drive circuit 41 can be suppressed. Thus, stable rotation control of the motor 1 can be obtained.

Further, since the output waveform of the drive circuit 41 is a sign wave and its carrier frequency is 10 kHz or higher, even in the case of using the consequent pole type motor 1, vibration of the motor 1 due to current harmonics can be reduced.

Second Embodiment

Figure 9:
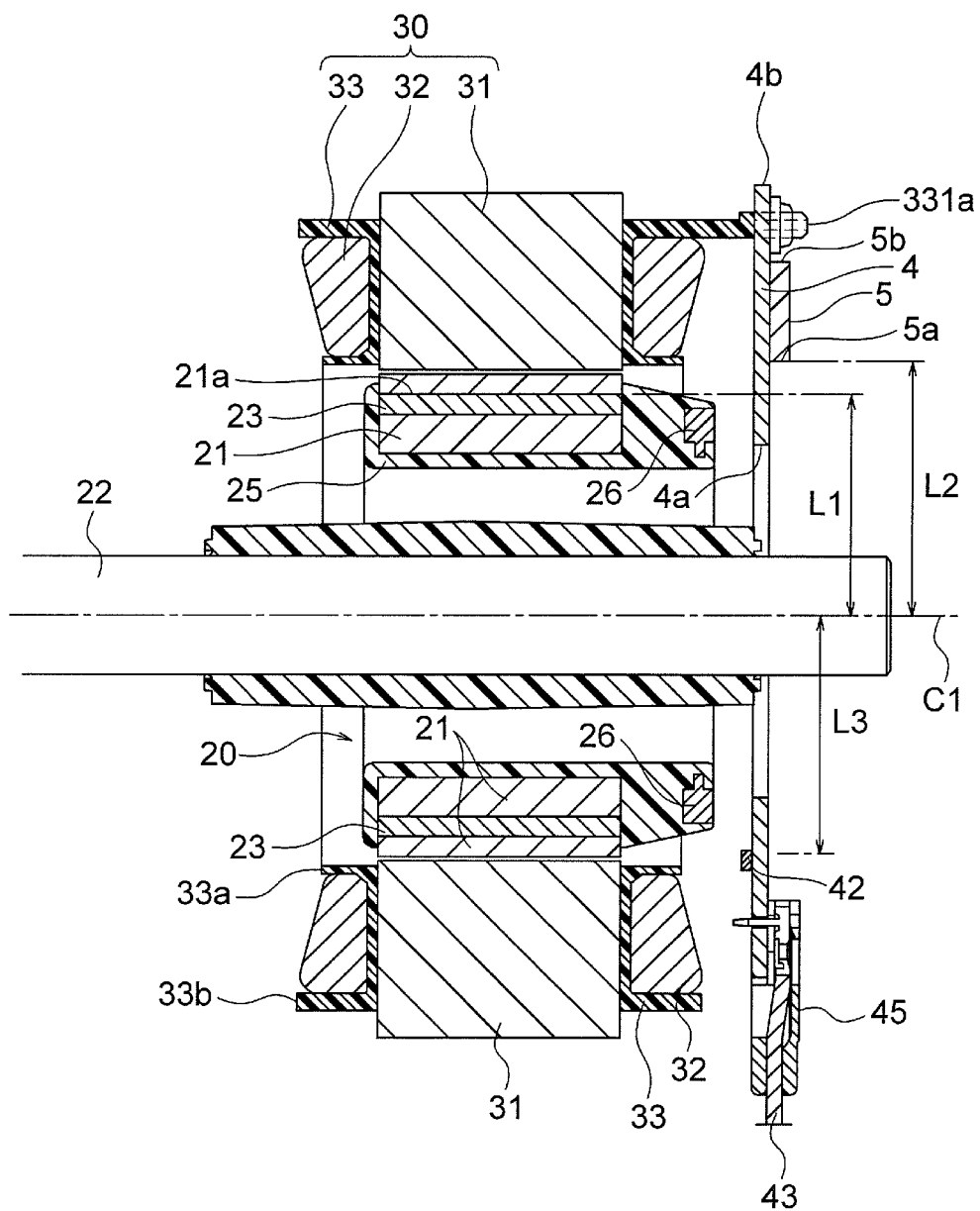
FIG. 9 is a longitudinal sectional view illustrating a motor in a second embodiment.

Next, a second embodiment of the present invention will be described. FIG. 9 is a longitudinal sectional view illustrating a stator 30, a rotor 20, and a board 4 of a motor according to the second embodiment. In the first embodiment described above, the Hall elements 42 on the board 4 are disposed on the inner side of the rotor magnets 23 in the radial direction (FIG. 6).

In contrast, in the second embodiment, Hall elements 42 are disposed on an outer side of rotor magnets 23 in the radial direction. In other words, a distance L3 from a central axis C1 to an inner-peripheral-side end of the Hall element 42 is larger than the distance L1 from the central axis C1 to the outer-peripheral-side end of the rotor magnet 23.

In the consequent pole type motor 1, the imbalance of the magnetic flux density distribution is likely to occur in the axial direction with respect to the rotor magnets 23. In view of this, the Hall elements 42 are disposed on the outer side of the rotor magnets 23 in the radial direction, and thus influence of the imbalance of the magnetic flux density distribution on the Hall elements 42 can be suppressed. Accordingly, it is possible to enhance detection accuracy of the rotational position of the rotor 20 based on the detection signals of the Hall elements 42.

The motor according to the second embodiment is similar to the motor 1 according to the first embodiment except for arrangement of the Hall elements 42.

In the second embodiment, the Hall elements 42 are disposed on the outer side of the rotor magnets 23 in the radial direction, and thus influence of the imbalance of the magnetic flux density distribution on the Hall elements 42 can be suppressed. Accordingly, the detection accuracy of the magnetic flux by the Hall element 42 can be enhanced, and thus stable rotation control of the motor 1 can be performed.

Third Embodiment

Figure 10:
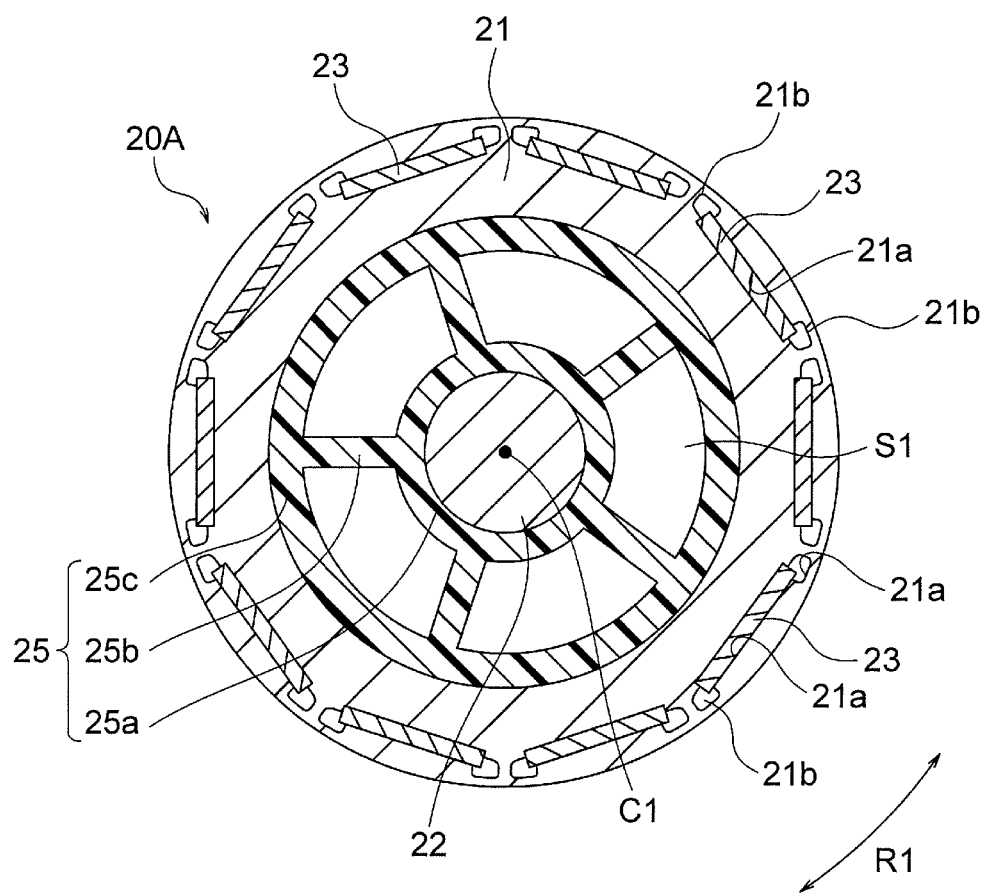
FIG. 10 is a cross sectional view illustrating a rotor of a motor in a third embodiment.

Next, a third embodiment of the present invention will be described. FIG. 10 is a cross sectional view illustrating a rotor 20A of a motor in a third embodiment. The motor 1 of the first embodiment described above is of the consequent pole type, and the rotor 20 includes the magnet magnetic poles (rotor magnets 23) and the pseudo-magnetic poles 21c (FIG. 2).

In contrast, the motor of the third embodiment is a non-consequent pole type. That is, as illustrated in FIG. 10, all of the magnetic poles of the rotor 20A are constituted by the rotor magnets 23.

More specifically, a rotor core 21 of the rotor 20A includes a plurality of magnet insertion holes 21a arranged in the circumferential direction. The number of the magnet insertion holes 21a is ten in this example. The ten magnet insertion holes 21a are arranged at regular intervals in the circumferential direction in an outer peripheral portion of the rotor core 21. A rotor magnet 23 is inserted in each of the ten magnet insertion holes 21a. That is, the rotor 20A includes ten magnetic poles, and all of the ten magnetic poles are magnet magnetic poles. The number of magnetic poles (the number of poles) of the rotor 20A is not limited to ten, and may be any number.

Each two of the rotor magnets 23 adjacent to each other in the circumferential direction are disposed so that the opposite poles face an outer peripheral side. That is, if the outer peripheral side of one rotor magnet 23 (i.e., the first magnet) is a north pole, the outer peripheral side of its adjacent rotor magnet 23 in the circumferential direction (i.e., the second magnet) is a south pole. The shape and material of the rotor magnet 23 are the same as those described in the first embodiment.

The motor according to the third embodiment is similar to the motor according to the first embodiment except for the configuration of the rotor 20A.

In the motor of the third embodiment, all of the magnetic poles of the rotor 20A are constituted by the rotor magnets 23, and thus an imbalance of the magnetic flux density distribution is less likely to occur as compared to the consequent pole type motor. Thus, stable rotation control of the motor 1 can be performed. Further, since the motor of the third embodiment is of the non-consequent pole type, vibration due to current harmonics is less likely to occur, and noise and vibration of the motor 1 can be suppressed.

As described in the second embodiment, in the motor of the third embodiment, the Hall element 42 may be disposed on the outer side of the rotor magnets 23 in the radial direction.

Fourth Embodiment

Figure 11:
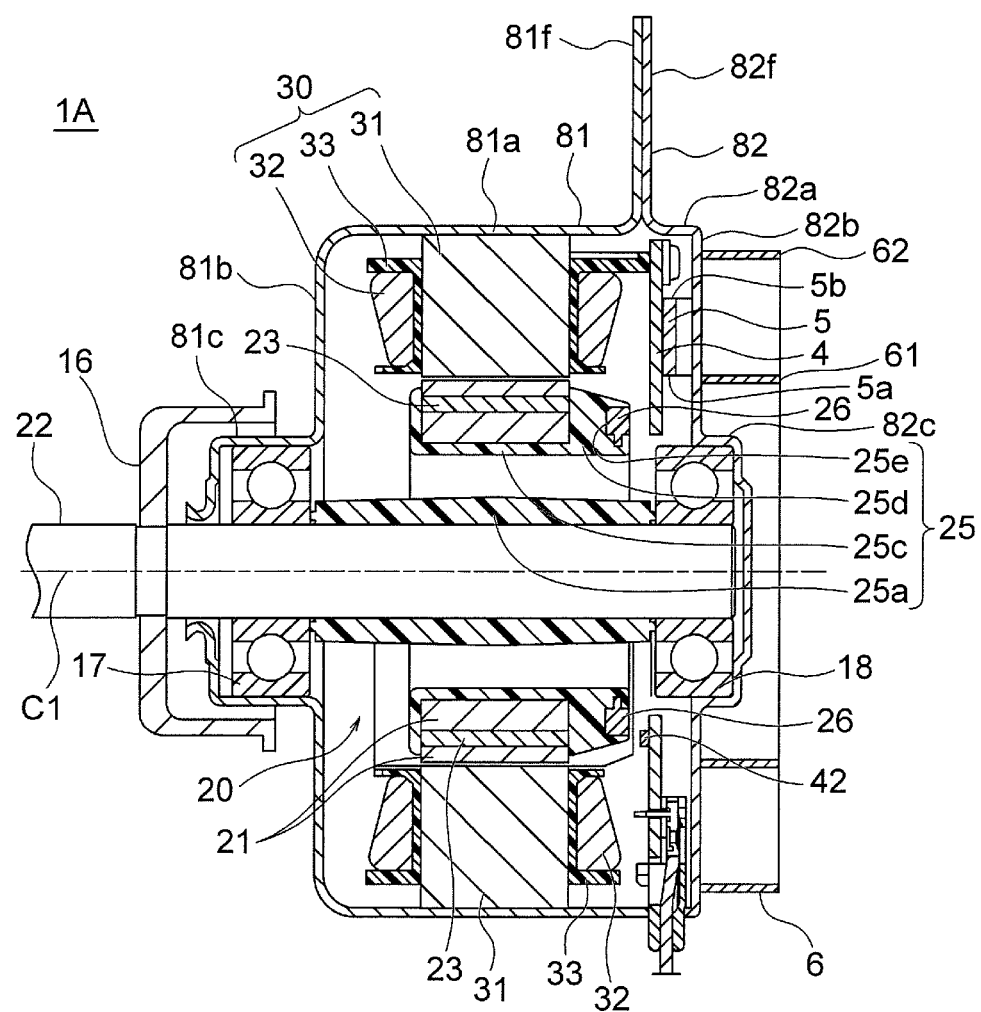
FIG. 11 is a longitudinal sectional view illustrating a motor in a fourth embodiment.

Next, a fourth embodiment of the present invention will be described. FIG. 11 is a longitudinal sectional view illustrating a motor 1A in a fourth embodiment. In the motor 1 of the first embodiment described above, the stator 30, the board 4, and the microcomputer 5 are covered with the mold resin portion 35 (FIG. 1).

In contrast, as illustrated in FIG. 11, the motor 1A of the fourth embodiment does not include the mold resin portion 35. Instead, the motor 1A includes a frame 8 covering a stator 30, a board 4, and a microcomputer 5. The frame 8 is composed of metal such as aluminum.

The frame 8 is divided into a first frame portion 81 and a second frame portion 82 in the axial direction. The first frame portion 81 includes a cylindrical portion 81a that is cylindrical about the central axis C1. The stator 30 is inserted in the cylindrical portion 81a. A flange 81f is formed at an end portion (right in the figure) of the cylindrical portion 81a on the second frame portion 82 side. A wall 81b perpendicular to the axial direction is formed at an end portion (left in the figure) of the cylindrical portion 81a opposite to the flange 81f. A bearing holding part 81c is formed in a center portion of the wall 81b in the radial direction, and the bearing 17 is held inside the bearing holding part 81c.

The second frame portion 82 includes a cylindrical portion 82a that is cylindrical about the central axis C1. The board 4 is disposed in a space inside the cylindrical portion 82a. A flange 82f is formed at an end portion (left in the figure) of the cylindrical portion 82a on the first frame portion 81 side. A wall 82b perpendicular to the axial direction is formed at an end portion (right in the figure) of the cylindrical portion 82a opposite to the flange 82f. The wall 82b faces the board 4 in the axial direction. A bearing holding part 82c is formed in a central portion of the wall 82b in the radial direction, and the bearing 18 is held in the bearing holding part 82c.

The heat sink 6 is attached to a side of the wall 82b opposite to the board 4. The wall 82b may be in contact with the microcomputer 5, or a heat conductive member may be disposed between the wall 82b and the microcomputer 5.

The flange 81f of the first frame portion 81 and the flange 82f of the second frame portion 82 are fixed to each other by bonding, screw fixing, or welding.

The motor 1A of the fourth embodiment is similar to the motor of the first embodiment except that the frame 8 is provided instead of the mold resin portion 35.

In the motor 1A of the fourth embodiment, since the metal frame 8 covers the stator 30, the board 4, and the microcomputer 5, heat generated by the coils 32, the microcomputer 5 or the like is likely to be dissipated to the outside by way of the frame 8, and thus heat dissipation can be enhanced. Further, since the heat sink 6 is attached to the wall 82b of the frame 8 facing the board 4, heat dissipation can be further enhanced.

In the motor 1A of the fourth embodiment, the Hall elements 42 may be disposed on the outer side of the rotor magnets 23 in the radial direction as described in the second embodiment, or the rotor 20A of the non-consequent pole structure may be used as described in the third embodiment.

In the rotors 20 and 20A described in the first through fourth embodiments, the resin portion 25 is disposed between the shaft 22 and the rotor core 21, but the embodiments are not limited to such a configuration. For example, the shaft 22 may be fixed to a shaft hole formed in the rotor core 21 by shrink fitting, crimping, or the like.

(Air Conditioning Apparatus)

Figure 12:
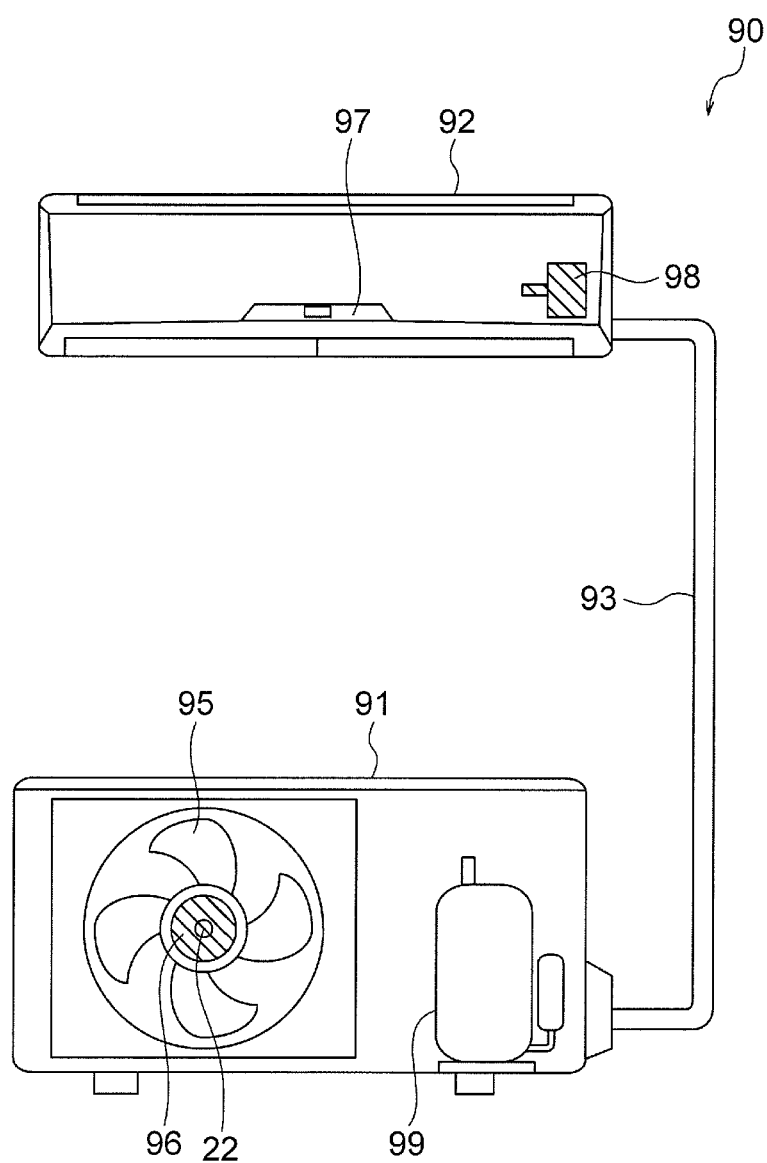
FIG. 12 is a diagram illustrating a configuration example of an air conditioning apparatus to which the motors of the first through forth embodiments are applied.

Next, a configuration example of an air conditioning apparatus to which the motors 1 and 1A described in the first through fourth embodiments are applicable. FIG. 12 is a diagram illustrating a configuration of an air conditioning apparatus 90 to which the motors 1 and 1A are applicable.

The air conditioning apparatus 90 includes an outdoor unit 91, an indoor unit 92, and a refrigerant pipe 93 connecting the outdoor unit 91 and the indoor unit 92 to each other. The outdoor unit 91 includes a first fan (fan) 95 and a first motor 96 that rotates an impeller of the first fan 95. The indoor unit 92 includes a second fan 97 and a second motor 98 that rotates an impeller of the second fan 97. FIG. 12 also shows a compressor 99 that compresses refrigerant in the outdoor unit 91.

The motors 1 and 1A described in the first through fourth embodiments are applicable to at least one of the first motor 96 and the second motor 98. As described above, the motors 1 and 1A described in the first through fourth embodiments are inexpensive and enable stable rotation control using the microcomputer 5. Thus, manufacturing cost of the air conditioning apparatus 90 can be reduced, and stable operation of the air conditioning apparatus 90 can be performed.

The motors 1 and 1A described in the first through fourth embodiments may be mounted on electrical equipment except for air conditioning apparatuses.

Although preferred embodiments of the present invention have been specifically described, the present invention is not limited to the embodiments described above, and various changes and modifications may be made within the gist of the invention.

What is claimed is:

1. A motor comprising:
a rotor having a rotation shaft, a rotor core attached to the rotation shaft, and a rotor magnet embedded in the rotor core;
a stator disposed on an outer side of the rotor in a radial direction about a central axis of the rotation shaft, the stator surrounding the rotor;
a board disposed on one side of the stator in a direction of the central axis;
a microcomputer mounted on the board and performing arithmetic processing;
a drive circuit mounted on the board and controlling rotation of the rotor;
a mold resin portion covering the stator, the board, the microcomputer and the drive circuit; and
a heat sink disposed on a side of the board opposite to the stator,
wherein the heat sink is disposed to face the microcomputer and the drive circuit, and is exposed to an outside from the mold resin portion,
wherein the microcomputer is provided on a surface of the board opposite to the stator, the microcomputer being disposed on an outer side of the rotor magnet in the radial direction, and
wherein a distance from the central axis to the microcomputer in the radial direction is longer than a distance from the central axis to the drive circuit in the radial direction.

2. The motor according to claim 1, wherein the rotor has a magnet magnetic pole formed by the rotor magnet, and a pseudo-magnetic pole formed by the rotor core.

3. The motor according to claim 1, wherein the rotor has a first magnet as the rotor magnet, and a second magnet forming a magnetic pole having a polarity opposite to the first magnet.

4. The motor according to claim 1, wherein the stator has a yoke extending in a circumferential direction about the central axis, and a first tooth and a second tooth extending toward the central axis from the yoke, the first tooth and the second tooth being adjacent to each other in the circumferential direction,
wherein the microcomputer is disposed between the first tooth and the second tooth in the circumferential direction.

5. The motor according to claim 1, wherein the stator has a stator core and an insulator disposed on the stator core, the insulator having a board fixing portion to which the board is fixed.

6. The motor according to claim 1, further comprising a frame composed of metal and covering the stator, the board, and the microcomputer.

7. The motor according to claim 1, wherein the drive circuit is disposed on a side of the board opposite to the stator.

8. The motor according to claim 1, wherein an output waveform of the drive circuit is a sine wave, and a carrier frequency of the output waveform is 10 kHz.

9. The motor according to claim 1, further comprising a resin portion disposed between the rotation shaft and the rotor core, the resin portion supporting the rotor core.

10. The motor according to claim 1, further comprising a Hall element mounted on the board, the Hall element detecting magnetic flux from the rotor.

11. The motor according to claim 10, wherein the microcomputer performs arithmetic processing to detect a rotational position of the rotor, based on a detection result of the Hall element.

12. The motor according to claim 10, wherein the Hall element is disposed on a surface of the board facing the stator.

13. The motor according to claim 10, wherein the Hall element is disposed on the outer side of the rotor magnet in the radial direction.

14. The motor according to claim 10, further comprising a sensor magnet mounted on the rotor, the sensor magnet facing the board in the direction of the central axis.

15. An air conditioning apparatus comprising an outdoor unit and an indoor unit connected to the outdoor unit via a refrigerant pipe,
at least one of the outdoor unit and the indoor unit comprising a fan,
the fan comprising an impeller and a motor rotating the impeller, the motor comprising:

a rotor having a rotation shaft, a rotor core attached to the rotation shaft, and a rotor magnet embedded in the rotor core;

a stator disposed on an outer side of the rotor in a radial direction about a central axis of the rotation shaft, the stator surrounding the rotor;

a board disposed on one side of the stator in a direction of the central axis;

a microcomputer mounted on the board and performing arithmetic processing;

a drive circuit mounted on the board and controlling rotation of the rotor;

a mold resin portion covering the stator, the board, the microcomputer and the drive circuit; and a heat sink disposed on a side of the board opposite to the stator, wherein the heat sink is disposed to face the microcomputer and the drive circuit, and is exposed to an outside from the mold resin portion, wherein the microcomputer is provided on a surface of the board opposite to the stator, the microcomputer being disposed on an outer side of the rotor magnet in the radial direction, and wherein a distance from the central axis to the microcomputer in the radial direction is longer than a distance from the central axis to the drive circuit in the radial direction.

16. The air conditioning apparatus according to claim 15, wherein the rotor has a magnet magnetic pole formed by the rotor magnet, and a pseudo-magnetic pole formed by the rotor core.

17. The air conditioning apparatus according to claim 15, wherein the rotor has a first magnet as the rotor magnet, and a second magnet forming a magnetic pole having a polarity opposite to the first magnet.

18. The air conditioning apparatus according to claim 15, the motor further comprising a Hall element mounted on the board, the Hall element detecting magnetic flux from the rotor.

* * * * *